United States Patent
Kojima (10) Patent No.: US 7,518,405 B2
(45) Date of Patent: *Apr. 14, 2009

(54) IMPEDANCE MATCHING CIRCUIT, INPUT-OUTPUT CIRCUIT AND SEMICONDUCTOR TEST APPARATUS

(75) Inventor: Shoji Kojima, Tokyo (JP)

(73) Assignee: Advantest Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/973,547

(22) Filed: Oct. 9, 2007

(65) Prior Publication Data

US 2008/0186050 A1    Aug. 7, 2008

Related U.S. Application Data

(63) Continuation of application No. 11/326,182, filed on Jan. 5, 2006, now Pat. No. 7,317,336.

(30) Foreign Application Priority Data

Jan. 7, 2005    (JP) .............................. 2005-002098

(51) Int. Cl.
    *H03K 19/0175* (2006.01)
(52) U.S. Cl. .......................................... 326/82; 326/30
(58) Field of Classification Search .................. 326/26, 326/27, 30, 82–86
    See application file for complete search history.

*Primary Examiner*—Don P Le
(74) *Attorney, Agent, or Firm*—Muramatsu & Associates (57) ABSTRACT

A characteristic test of a DUT having a low transmission line driving capability can be performed with a simple configuration and low cost. An impedance matching circuit is connected between a transmission line and a DUT in an input-output circuit of a semiconductor test apparatus. The impedance matching circuit includes: a resistance; an analog computing unit which multiplies a voltage from one end of the resistance by a predetermined number, subtracts a voltage from the other end of the resistance from the voltage multiplied by the predetermined number and outputs a resultant voltage; and a buffer which outputs a signal from the analog computing unit with low impedance. The impedance matching circuit produces an output signal from the DUT with low impedance, thereby sufficiently driving the transmission line.

7 Claims, 11 Drawing Sheets

IMPEDANCE MATCHING CIRCUIT, INPUT-OUTPUT CIRCUIT AND SEMICONDUCTOR TEST APPARATUS

This is a continuation of prior U.S. application Ser. No. 11/326,182 filed Jan. 5, 2006, now U.S. Pat. No. 7,317,336 which is incorporated herein by reference.

BACKGROUND OF THE INVENTION

1. Field of the Invention

The present invention relates to a semiconductor test apparatus which executes a characteristic test of a device under test (DUT), an input-output circuit which receives/transmits a signal with respect to the DUT and an impedance matching circuit which can be connected with this input-output circuit, and more particularly to a semiconductor test apparatus suitable for a characteristic test of a DUT having a low output terminal driving capability, an input-output circuit and an impedance matching circuit provided in the semiconductor test apparatus.

2. Description of the Related Art

Prior to an explanation of the present invention, a configuration of a conventional semiconductor test apparatus will be first described with reference to FIG. 12. As shown in the drawing, a semiconductor test apparatus 100 which determines a DUT 10 as a test target includes, as a main configuration, a pattern generator 20 which generates a test pattern, an expected pattern or the like, a waveform formatter 30 which formats the test pattern from this pattern generator 20 into a test signal waveform, an input-output circuit 200 which transmits the test signal waveform formatted by the waveform formatter 30 to the DUT 10 and receives an output signal outputted based on the test pattern from the DUT 10, judging means (a pattern comparator) 40 which logically compares the output signal (a test result) outputted from the DUT 10 with the expected pattern from the pattern generator 20 to detect a match/mismatch so that a quality of the DUT 10 is judged, direct-current testing means 50 which has a voltage source (not shown) which applies a desired direct-current voltage to the DUT 10 or a current detecting portion (not shown) which detects a power supply current supplied to the DUT 10 to allow the judging means 40 to judge a quality of the DUT 10, and others.

Figure 13:
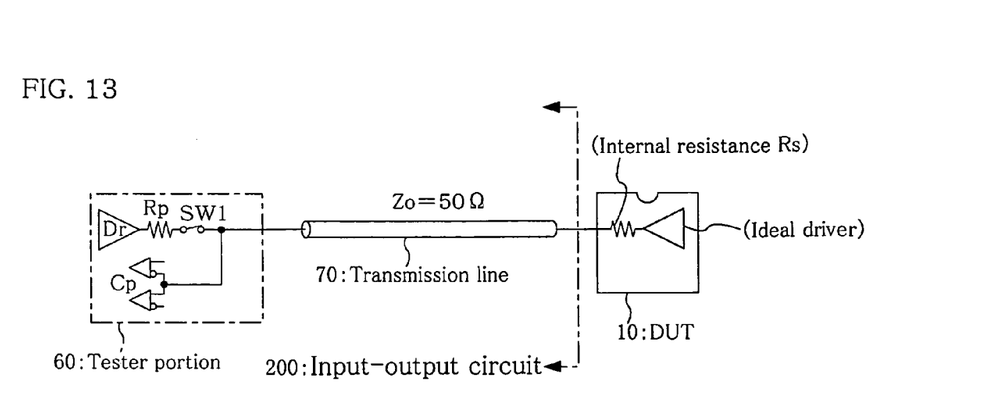
FIG. 13 is a schematic view showing a configuration of a conventional input-output circuit.

Here, as shown in FIG. 13, the input-output circuit 200 has a driver Dr which supplies the test pattern from the waveform formatter 30 to the DUT 10, a comparator Cp which receives an output signal from the DUT 10 and supplies it to the judging means 40, a resistance Rp which is an output load of this comparator Cp, and others.

It is to be noted that a part including the driver Dr, the comparator Cp and others will be referred to as a tester portion 60.

Further, in the input-output circuit 200, the driver Dr, the comparator Cp and the DUT 10 are connected with each other through a transmission line 70. As the transmission line 70, there is usually employed a coaxial cable having an impedance Zo=50Ω and a length of several-ten cm to several m.

Various kinds of technologies concerning such an input-output circuit 200 have been conventionally proposed (see, e.g., International Publication WO 03/008985).

It is to be noted that an output pin of the DUT 10 is modelized by using an ideal driver and an internal resistance.

Meanwhile, the DUT 10 which is a test target of the semiconductor test apparatus 100 has been recently diversified. For example, there are a DUT having a very low power consumption like an IC for a clock or a DUT which is not destroyed even if a high voltage such as 20 V is applied thereto like a semiconductor for an automobile.

Among others, a lower-power-consumption type DUT tends to be designed in such a manner that its output driving capability is intentionally lowered in order to reduce a power consumption. In such a DUT, a current intake/discharge capability is limited to a predetermined level. Therefore, when the DUT is to drive a 50-Ω type transmission line, i.e., a low impedance transmission line, this current limit is effected, and the DUT behaves as if an internal resistance is suddenly increased. In such a case, a correct waveform cannot be observed on a tester side.

Thus, in order to avoid this problem, it was possible to redesign the tester side of the semiconductor test apparatus to correspond to the low-power-consumption type DUT. However, there is a problem that a research/development cost or a manufacturing cost is increased.

Figure 14:
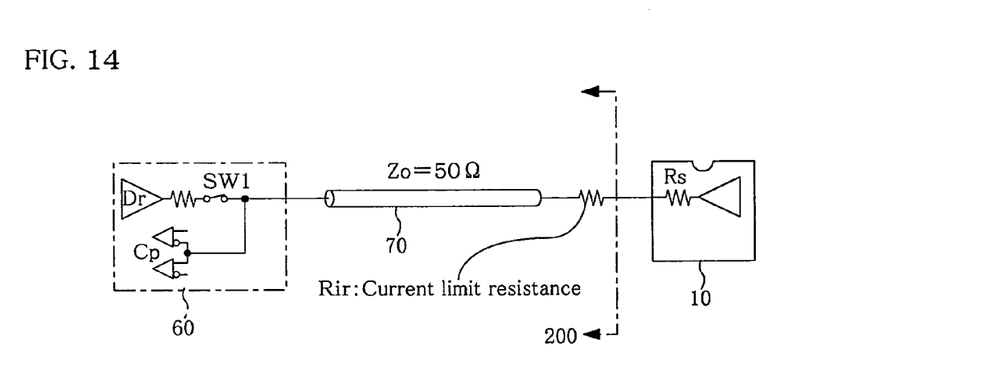
FIG. 14 is a schematic view showing another configuration of the conventional input-output circuit.

Therefore, as a method of coping with the low-power-consumption type DUT at a low cost, there is used as a method which inserts a current limit resistance Rir to the outside of the DUT 10 as shown in FIG. 14 (a first prior art), for example.

According to this configuration, the DUT 10 can drive a transmission line as long as the current limit in the DUT 10 is not affected.

Figure 15:
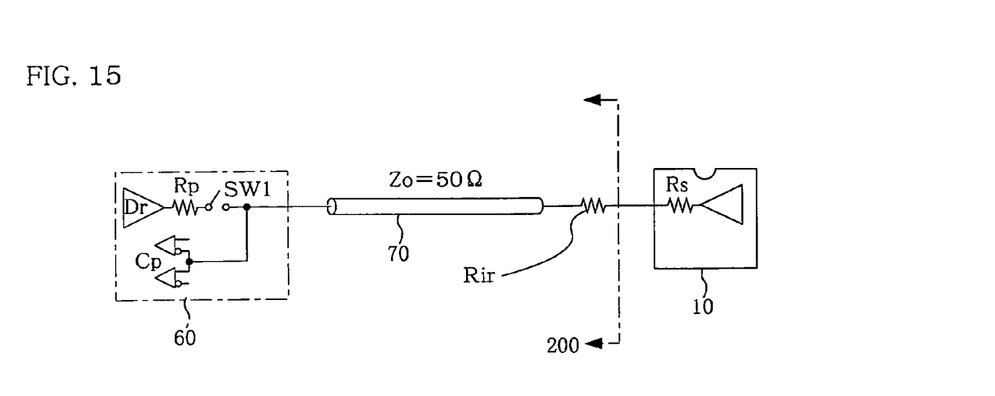
FIG. 15 is a schematic view showing still another configuration of the conventional input-output circuit.

Furthermore, as another method, as shown in FIG. 15, there can be considered of controlling a switch SW1 in a tester portion 60 to disconnect a terminating resistance Rp (a second prior art) from the transmission line.

As a result, a high-impedance termination rather than a 50-Ω termination is provided, and a voltage supplied from the DUT 10 can be directly transmitted to a comparator Cp in a tester portion 60.

However, the first prior art has a problem that inserting the current limit resistance Rir causes an amplitude of a signal output from the DUT 10 to be divided by the current limit Rir and an impedance Zo of the transmission line 70, and hence a small amplitude must be detected on the tester side.

Moreover, the second prior art has a problem that a high impedance at both ends of the transmission line 70 generates multipath reflection, a long time is required for a waveform to be converged, and a test with a high speed/a high timing accuracy becomes difficult.

SUMMARY OF THE INVENTION

In view of the above-described problems, it is an object of the present invention to provide an impedance matching circuit, an input-output circuit and a semiconductor test apparatus which can normally drive a transmission line of a DUT having a low output driving capability by using a simple configuration at a low cost to execute a characteristic test of the DUT, and can conduct a test with a high speed/a high timing accuracy without reducing an amplitude of an output signal generated by the DUT at the time of the test.

To this end, according to the present invention, there is provided an impedance matching circuit having: a first resistance; a first analog computing unit which multiplies a voltage at one end of this first resistance by a predetermined number and subtracts a voltage at the other end of the first resistance from the voltage multiplied by the predetermined number to output a voltage obtained by this subtraction; a second resistance connected with an output side of this first analog computing unit; and a second analog computing unit which multiplies a voltage at one end of this second resistance by a predetermined number and subtracts a voltage at the other end of the second resistance from the voltage multiplied by the predetermined number to output a voltage obtained by this subtraction, wherein the first resistance is connected with an output side of the second analog computing unit.

When the impedance matching circuit is configured in this manner, direct-current impedance matching can be realized in a simple and small circuit configuration.

Additionally, when this impedance matching circuit is inserted into a part in the vicinity of the DUT in the semiconductor test apparatus as an assist circuit which intensifies an output from the DUT having a low driving capability, a voltage waveform with a desired amplitude can be obtained from the DUT having the low transmission line driving capability without largely changing hardware of the test apparatus, thereby effecting the characteristic test.

Further, the impedance matching circuit according to the present invention has a configuration in which a first buffer is connected between the output side of the first analog computing unit and the second resistance.

When the impedance matching circuit is configured in this manner, since the first analog computing unit is separated from an external circuit by the first buffer, it is possible to prevent the first analog computing unit from being affected by a disturbance.

Furthermore, the impedance matching circuit according to the present invention has a configuration in which the first buffer has a voltage gain 1 or an amplification factor of a predetermined multiple.

If the impedance matching circuit has such a configuration, a signal can be output with low impedance without changing a voltage value when the first buffer has the voltage gain 1. On the other hand, when the first buffer has the amplification factor of a predetermined multiple, a voltage of a test driver can be apparently increased.

Moreover, the impedance matching circuit according to the present invention has a configuration in which a second buffer is connected between the output side of the second analog computing unit and the first resistance.

When the impedance matching circuit has such a configuration, since the second analog computing unit is separated from an external circuit by the second buffer, the second analog computing unit can be prevented from being affected by a disturbance.

Additionally, the impedance matching circuit according to the present invention has a configuration in which the second buffer has a voltage gain 1 (unity gain) or an amplification factor of a predetermined multiple (larger than unity gain).

Since the impedance matching circuit has such a configuration, a signal can be output with low impedance without changing a voltage value when the second buffer has the voltage gain 1. On the other hand, when the second buffer has the amplification factor of a predetermined multiple, i.e., larger than unity, a voltage of a test driver can be apparently increased.

Further, the impedance matching circuit according to the present invention has a configuration in which the first analog computing unit has: a first operational amplifier which inputs a voltage from one end of the first resistance to its non-inverting terminal; a second operational amplifier which inputs a voltage from the other end of the first resistance to its non-inverting terminal; a third operational amplifier which inputs an output from the first operational amplifier to its non-inverting terminal and inputs an output from the second operational amplifier to its inverting terminal; an inverting input side resistance connected between an output side of the second operational amplifier and an inverting input terminal of the third operational amplifier; and a feedback resistance having one end connected with an output side of the third operational amplifier and the other end connected with the inverting input terminal of the third operational amplifier.

When the impedance matching circuit has such a configuration, the first analog computing unit having two inputs and one output can be realized with a simple structure. Further, since the impedance matching circuit is configured to have the buffers and the resistances as well as this first analog computing unit, the small impedance matching circuit can be realized at a low cost.

Furthermore, the impedance matching circuit according to the present invention has a configuration in which the second analog computing unit has: a first operational amplifier which inputs a voltage from one end of the first resistance to its non-inverting terminal; a second operational amplifier which inputs a voltage from the other end of the first resistance to its non-inverting terminal; a third operational amplifier which inputs an output from the first operational amplifier to its non-inverting terminal and inputs an output from the second operational amplifier to its inverting terminal; an inverting input side resistance connected between an output side of the second operational amplifier and an inverting input terminal of the third operational amplifier; and a feedback resistance having one end connected with an output side of the third operational amplifier and the other end connected with the inverting input terminal of the third operational amplifier.

When the impedance matching circuit has such a configuration, the second analog computing unit having two inputs and one output can be realized with a simple structure. Moreover, since the impedance matching circuit is configured to have the buffers and the resistances as well as this second analog computing unit, the small impedance matching circuit can be realized at a low cost.

Additionally, according to the present invention, there is provided an input-output circuit having: a driver which transmits a predetermined signal to a semiconductor integrated circuit; a comparator which receives an output signal from the semiconductor integrated circuit; and a transmission line which is connected between the driver and/or the comparator and the semiconductor integrated circuit and transmits a predetermined signal and/or an output signal, wherein an impedance matching circuit which receives an output signal from the semiconductor integrated circuit and outputs it with a low impedance is provided between the transmission line and the semiconductor integrated circuit.

When the input-output circuit has such a configuration, since the impedance matching circuit is arranged in the vicinity of a DUT, when observing from the DUT side, it looks as if an input impedance of a tester pin is increased. As a result, since output impedance is high, an output signal from a DUT having a low transmission line driving capability can be assisted (intensified), and the transmission line can be driven, thereby obtaining a voltage waveform having desired amplitude on a tester side.

Additionally, although an additional circuit, i.e., the impedance matching circuit is inserted between the tester and the DUT, bi-directional signal transmission can be realized by using one transmission line. That is, as seen from the tester, a test which is the same as that of a regular I/O device can be realized.

Further, when the impedance matching circuit is inserted between the transmission line and the semiconductor integrated circuit (a DUT), a characteristic test of the DUT having a low driving capability can be executed. As a result, on the tester side, a research/development cost or a manufacturing cost can be reduced without largely changing hardware of the tester.

Furthermore, since the output impedance of the impedance matching circuit can be reduced, it is possible to eliminate the problem that multipath reflection is generated and a long time is required for a waveform to be converged because of high impedance at both ends of the transmission line 70. Therefore, a test with a high speed/a high timing accuracy can be performed.

Moreover, the input-output circuit according to the present invention has a configuration in which the impedance matching circuit is configured as mentioned above.

When the input-output circuit has such a configuration, an output signal from the semiconductor integrated circuit can be output with low impedance. As a result, the transmission line can be driven, and a desired voltage waveform can be obtained on the tester side, thereby executing a characteristic test of the semiconductor integrated circuit.

Additionally, according to the present invention, there is provided a semiconductor test apparatus comprising: a pattern generator which generates a test pattern and an expected pattern; a waveform formatter which formats the test pattern into a test signal waveform; an input-output circuit which transmits the test signal waveform to the semiconductor integrated circuit and receives an output signal from the semiconductor integrated circuit; and judging means for comparing the output signal with the expected pattern, wherein the input-output circuit consists of the input-output circuit as described in the foregoing.

When the semiconductor test apparatus has such a configuration, since an assist circuit, i.e., the impedance matching circuit which intensifies an output from a device having a low driving capability is arranged in the vicinity of a DUT, the transmission line can be driven to transmit a correct output signal from the DUT.

Further, since the simple and small impedance matching circuit is configured to be inserted between the transmission line and the DUT, this impedance matching circuit can be realized at a low cost without requiring a large change on the tester side.

Furthermore, according to the semiconductor test apparatus of the present invention, a conventional current limit resistance is not inserted, or a high-impedance termination is not provided by opening a switch of a tester portion to remove a terminating resistance. Therefore, amplitude of an obtained output signal is not reduced, and a characteristic test of a DUT can be executed with a high speed/a high timing accuracy.

As described above, according to the present invention, because the simple and small impedance matching circuit is inserted to a part in the vicinity of a DUT (between the transmission line and the DUT), an output from the DUT having a low transmission line driving capability can be enhanced, and the transmission line can be driven to correctly transmit a voltage waveform having a desired amplitude, thereby executing a characteristic test of the DUT.

DETAILED DESCRIPTION OF THE PREFERRED EMBODIMENTS

Preferred embodiments of an impedance matching circuit, an input-output circuit and a semiconductor test apparatus according to the present invention will now be described hereinafter with reference to the accompanying drawings.

[Configurations of Impedance Matching Circuit, Input-output Circuit and Semiconductor Test Apparatus]

Embodiments of an impedance matching circuit, an input-output circuit and a semiconductor test apparatus according to the present invention will be first described with reference to FIGS. 1 and 2.

Figure 1:
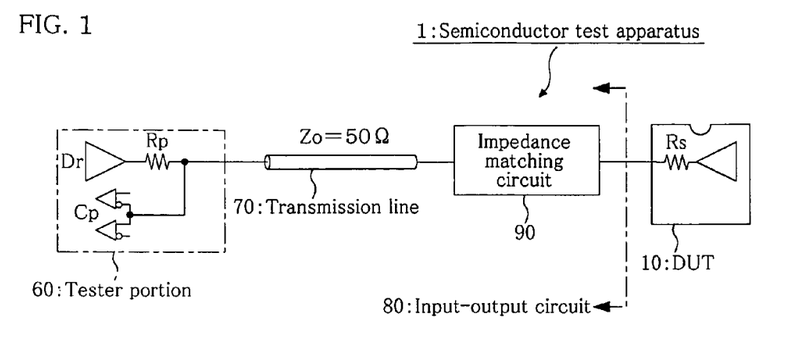
FIG. 1 is a schematic view showing a configuration of an input-output circuit according to the present invention.
Figure 2:
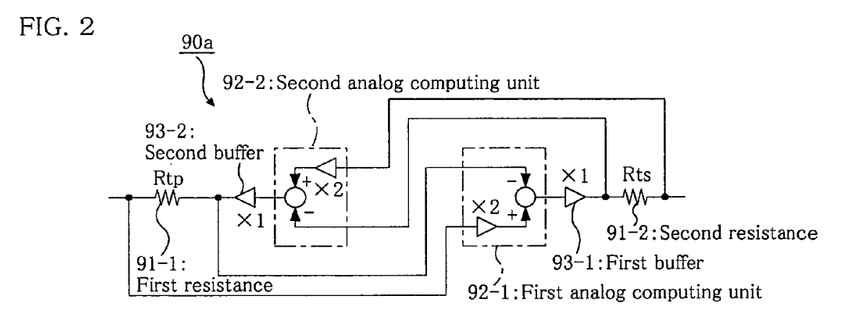
FIG. 2 is an electronic circuit diagram showing a configuration of an impedance matching circuit according to the present invention.

FIG. 1 is a structural view showing a circuit configuration of an input/output circuit according to the present invention, and FIG. 2 is an electronic circuit diagram showing a circuit configuration of an impedance matching circuit.

Figure 12:
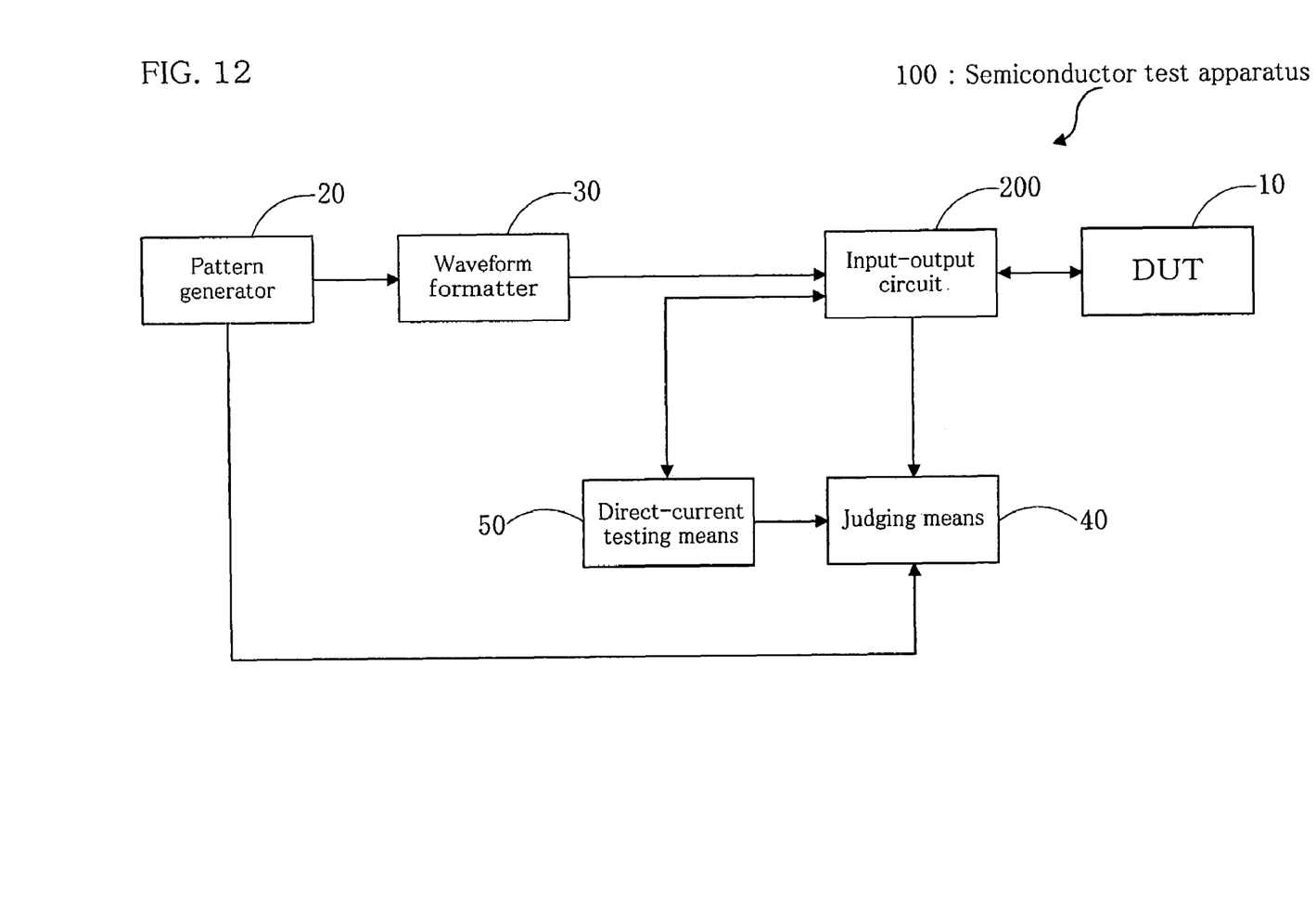
FIG. 12 is a block diagram showing a configuration of a conventional semiconductor test apparatus.

An input-output circuit 80 shown in FIG. 1 is provided in a semiconductor test apparatus 1 which is the same as the conventional apparatus depicted in FIG. 12.

The semiconductor test apparatus 1 is a test apparatus which judges a quality of a DUT (a device under test) 10, and has, as a main configuration, a pattern generator 20, a waveform formatter 30, judging means 40 and direct-current testing means 50 and further has the input-output circuit 80 according to this embodiment as shown in FIG. 12.

Here, as shown in FIG. 1, the input-output circuit 80 has a tester portion 60 including a driver Dr, a comparator Cp and a resistance Rp, this tester portion 60 and the DUT 10 are connected with each other through a transmission line 70, and an impedance matching circuit 90 is connected between this transmission line 70 and the DUT 10.

As shown in FIG. 2, the impedance matching circuit 90 (90a) has a resistance 91 (a first resistance Rtp 91-1 and a second resistance Rts 91-2), an analog computing unit 92 having two inputs and one output (a first analog computing unit 92-1 and a second analog computing unit 92-2), and a buffer 93 (a first buffer 93-1 and a second buffer 93-2).

One end of the first resistance Rtp 91-1 (a terminating resistance Rtp) is connected with a tester side (a transmission line side), and the other end of the same is connected with an output side of the second buffer 93-2.

The first analog computing unit 92-1 receives a voltage from one end of the first resistance Rtp 91-1 (one end connected with the tester side (the transmission line side)) and a voltage from the other end of the same (the other end connected with the output side of the second buffer 93-2), i.e., the first analog computing unit 92-1 has two inputs. Then, the first analog computing unit 92-1 multiplies the voltage input from one end of the first resistance Rtp 91-1 by a predetermined number (two in this embodiment). Further, it subtracts the voltage from the other end of the first resistance Rtp 91-1 from the voltage multiplied by the predetermined number. Subsequently, the first analog computing unit 92-1 outputs a voltage obtained by this subtraction, i.e., the first analog computing unit 92-1 has one output.

The first buffer 93-1 outputs the output from the first analog computing unit 92-1 with low impedance.

One end of the second resistance Rts 91-2 (a terminating resistance Rts) is connected with a terminal of the DUT 10, and the other end of the same is connected with an output side of the first buffer 93-1.

The second analog computing unit 92-2 respectively receives a voltage from one end (one end connected with the DUT 10) of the second resistance Rts 91-2 and a voltage from the other end of the same (the other end connected with the output side of the first buffer 93-1), i.e., the second analog computing unit 92-2 has two inputs. Then, it multiplies the voltage input from one end of the second resistance Rts 91-2 by a predetermined number (two in this embodiment). Furthermore, the second analog computing unit 92-2 subtracts the voltage from the other end of the second resistance Rts 91-2 from the voltage multiplied by the predetermined number. Moreover, it outputs a voltage obtained by this subtraction, i.e., the second analog computing unit 92-2 has one output.

The second buffer 93-2 outputs the output from the second analog computing unit 92-2 with low impedance.

It is to be noted that the resistance Rtp is determined as the "first resistance 91-1" and the resistance Rts is determined as the "second resistance 91-2" in the impedance matching circuit 90 according to this embodiment. However, the "first resistance 91-1" or the "second resistance 91-2" have this order for the convenience's sake. Therefore, the resistance Rtp can be referred to as a second resistance 91-2 and the resistance Rts can be referred to as a first resistance 91-1.

Figure 3:
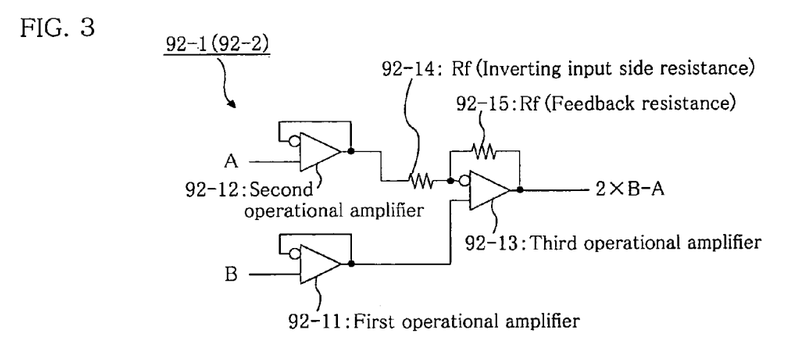
FIG. 3 is an electronic circuit diagram showing a configuration of an analog computing unit.

As shown in FIG. 3, the analog computing unit 92 can be constituted of a circuit using operational amplifiers.

For example, the first analog computing unit 92-1 is configured to have: a first operational amplifier 92-11 which inputs a voltage from one end of the first resistance 91-1 to its non-inverting terminal; a second operational amplifier 92-12 which inputs a voltage from the other end of the first resistance 91-1 to its non-inverting terminal; a third operational amplifier 92-13 which inputs an output from the first operational amplifier 92-11 to its non-inverting terminal and inputs an output from the second operational amplifier 92-12 to its inverting terminal; an inverting input side resistance 92-14 connected between an output side of the second operational amplifier 92-12 and an inverting input terminal of the third operational amplifier 92-13; and a feedback resistance 92-15 having one end connected with an output side of the third operational amplifier 92-13 and the other end connected with the inverting input terminal of the third operational amplifier 92-13.

According to this configuration, the analog computing unit having two inputs and one output can be realized.

It is to be noted that this configuration can be adopted in not only the first analog computing unit 92-1 but also the second analog computing unit 92-2.

However, the first analog computing unit 92-1 or the second analog computing unit 92-2 can be constituted of a circuit other than such a circuit using operational amplifiers as shown in FIG. 3.

The buffer 93 separates the analog computing unit 92 from an external circuit to prevent the analog computing unit 92 from being affected by a disturbance.

For example, an operational amplifier is used as the analog computing unit 92, an output impedance of this operational amplifier is not zero $\Omega$, and there is a feedback resistance at an output portion of this operational amplifier. Here, when the output impedance of the operational amplifier is high, a disturbance which has affected the output terminal of this operational amplifier is applied to a calculation result as an error. Thus, when the buffer 93 is inserted in the output side of the operational amplifier (the analog computing unit 92), the analog computing unit 92 can be prevented from undergoing a disturbance, thereby suppressing an error generated in a calculation result.

Furthermore, the buffer 93 is a low-impedance output amplifier having a voltage gain 1.

Figure 4:
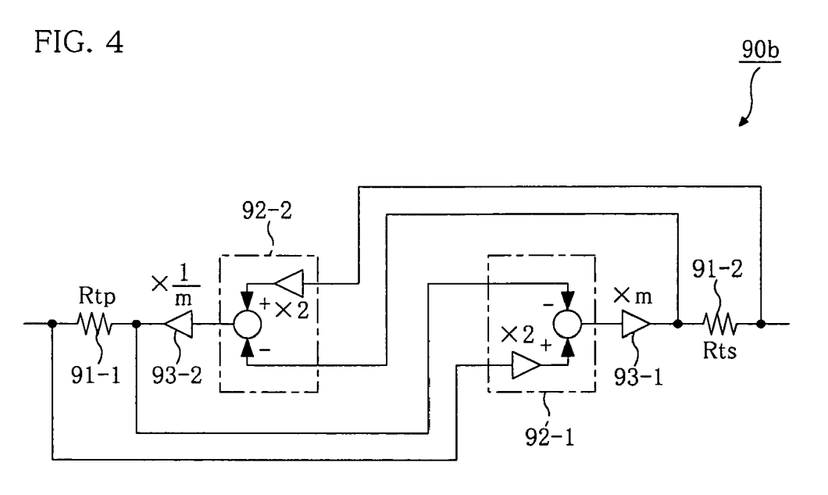
FIG. 4 is an electronic circuit diagram showing another configuration of the impedance matching circuit according to the present invention.

It is to be noted that the buffer 93 has the voltage gain 1 in FIG. 2, but the present invention is not restricted thereto. For example, as shown in FIG. 4 (an impedance matching circuit 90b), the buffer 93 may have an amplification factor of a predetermined multiple ("×1/m" or ×m"). As a result, a voltage of a tester driver can be apparently increased.

Figure 5:
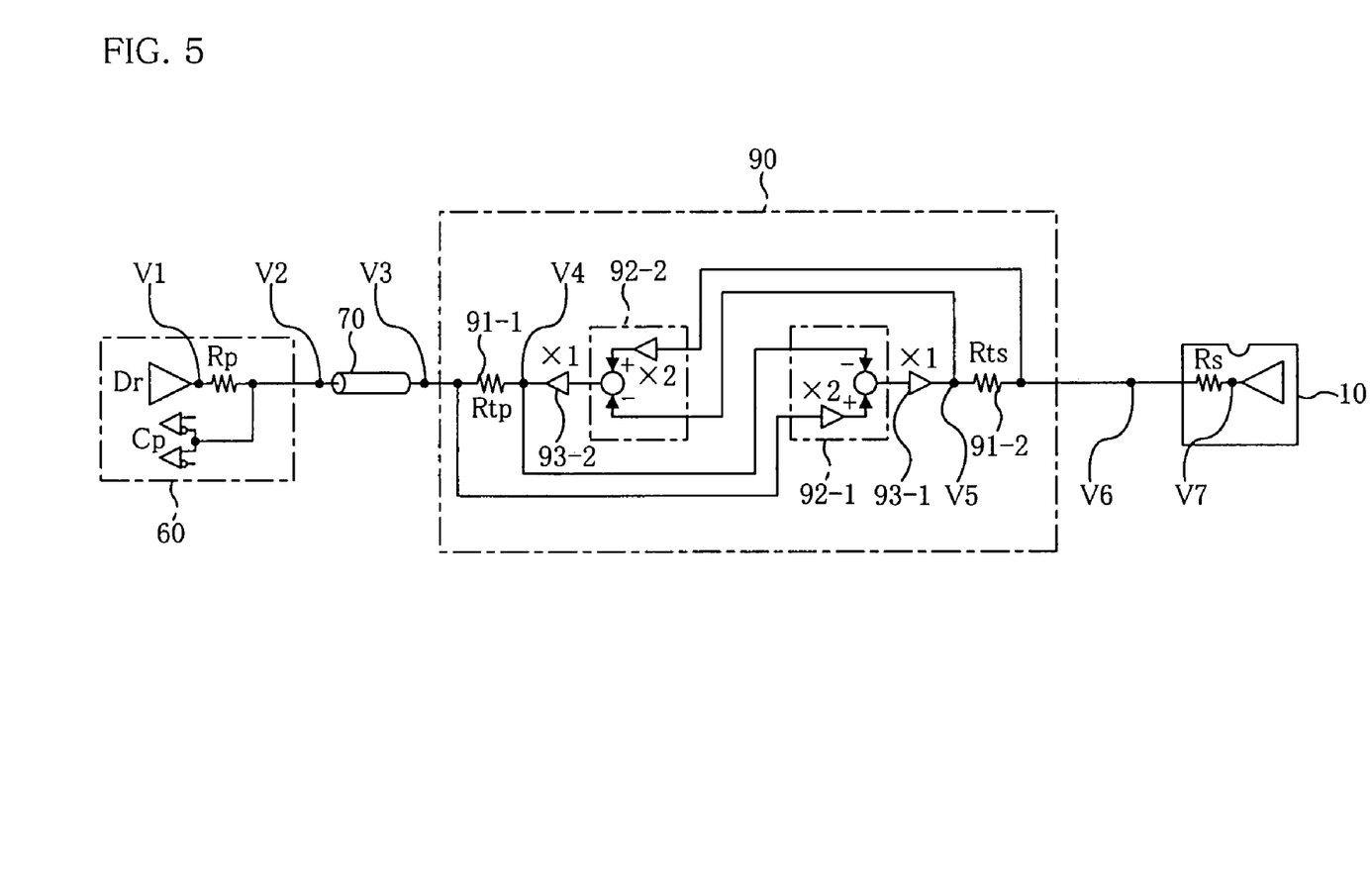
FIG. 5 is an electronic circuit diagram showing a position of each node of the input-output circuit to which a DUT is connected.

A fact that impedance matching can be performed by a circuit configuration of the impedance matching circuit according to this embodiment will now be verified with reference to FIG. 5.

This drawing is an electronic circuit diagram showing a configuration of the input-output circuit to which the impedance matching circuit according to this embodiment is connected and a voltage measuring position.

Here, voltages at respective nodes in the circuit are indicated by V1 (a voltage on the output side of the driver Dr in the tester portion), V2 (a voltage between the resistance Rp and the transmission line 70), V3 (a voltage between the transmission line 70 and the first resistance Rtp 91-1 of the impedance matching circuit 90), V4 (a voltage on the output side of the second buffer 93-2), V5 (a voltage on the output side of the first buffer 93-1), V6 (a voltage between the second resistance Rts 91-1 and the DUT 10) and V7 (a voltage between the internal resistance Rs of the DUT and an ideal driver).

The following voltages at the respective nodes are determined by respective equations:

$$V3=(Rtp \times V1+Rp \times V4)/(Rp+Rtp) \quad \text{(Equation 1)}$$

$$V5=2 \times V3-V4 \quad \text{(Equation 2)}$$

$$V6=(Rs \times V5+Rts \times V7)/(Rts+Rs) \quad \text{(Equation 3)}$$

$$V4=2 \times V6-V5 \quad \text{(Equation 4)}$$

Here, when Equation 1 is assigned to Equation 2 to set Rp=Rtp, the following equation is achieved:

$$V5=V1 \quad \text{(Equation 5)}$$

That is, a voltage output from the tester driver directly appears as V5. Based on this, when observing from the DUT side, it looks as if an output impedance of the tester driver is the second resistance Rts 91-2.

Next, based on Equation 3 and Equation 4, V4 can be represented by the following equation:

$$V4=\{(Rs-Rts) \times V5+2 \times Rts \times V7\}/(Rts+Rs) \quad \text{(Equation 6)}$$

Next, a current I1 output from the tester driver can be represented by the following equation:

$$I1=(V1-V4)/(Rp+Rtp) \quad \text{(Equation 7)}$$

Further, a current I2 which flows into the DUT 10 can be represented by the following equation:

$$I2=(V5-V7)/(Rts+Rs) \quad \text{(Equation 8)}$$

Here, when Equation 5 and Equation 6 are assigned to Equation 7 for organization and Equation 8 is further applied, the following equation can be obtained:

$$I1=I2\times 2\times Rts/(Rp+Rtp) \quad \text{(Equation 9)}$$

Based on this, it can be understood that the output current I1 of the driver and the current I2 which flows into the DUT 10 are simply determined by a ratio of the resistances.

Furthermore, Equation 9 is not relevant to Rs, which means that Equation is achieved irrespective of the internal resistance of the DUT 10.

This property means that a VSIM (Voltage Source I Measure: voltage application current measurement) test or an ISVM (I Source Voltage Measure: voltage application current measurement) test can be performed from the tester driver side when a coefficient like Equation 9 is taken into consideration.

Incidentally, when the internal resistance Rs of the DUT 10 has a special value, the following result can be obtained.

For example, when the internal resistance Rs has a value equal to the second resistance Rts 91-2, the following equation can be achieved based on Equation 6:

$$V4=V7 \quad \text{(Equation 10)}$$

That is, an output voltage of the DUT 10 directly appears as V4.

Based on this, when observing from the tester driver, it looks as if an output impedance of the DUT 10 is the first resistance Rts 91-1.

Furthermore, when the internal resistance Rs is infinitely great (when the DUT 10 is open), applying a residue theorem to Equation 6 to assign Equation 5 can obtain the following equation:

$$V4=V1 \quad \text{(Equation 11)}$$

Moreover, since the current I1 becomes zero at this time, the following equation can be attained:

$$V1=V3=V4 \quad \text{(Equation 12)}$$

That is, from the tester driver, it seems as if the first resistance Rts 91-1 is open.

Additionally, for example, when the internal resistance Rs=0 and V7=0 (assuming that the DUT 10 is short-circuited to GND), the following equation can be obtained based on Equation 6:

$$V4=-V5 \quad \text{(Equation 13)}$$

Further, if the terminating resistance Rp of the tester=the first resistance Rtp 91-1, Equation 5 can be applied, and the following equation is achieved:

$$V4=-V1 \quad \text{(Equation 14)}$$

When this result is assigned to Equation 1, the following equation can be attained:

$$V3=0 \quad \text{(Equation 15)}$$

This means that, if the DUT 10 is short-circuited to GND, it seems from the tester as if the first resistance Rts 91-1 is zero Ω and short-circuited to GND.

[Measurement of Voltage at Each Node]

A description will now be given as to results of measurement (Measurement 1 to Measurement 3) of voltage waveforms at respective nodes in the impedance matching circuit according to this embodiment with reference to FIGS. 5 to 10.

(Measurement 1)

First, a description will be given on voltage waveforms at respective nodes of the input-output circuit 40 when the terminating resistance Rp of the tester portion, the impedance Zo of the transmission line and the first resistance Rtp are respectively 50Ω (Rp=Zo=Rtp=50Ω) and the second resistance Rts and the internal resistance Rs of the DUT 10 are respectively 200Ω (Rts=Rs=200Ω) with reference to FIGS. 5 and 6.

Figure 6:
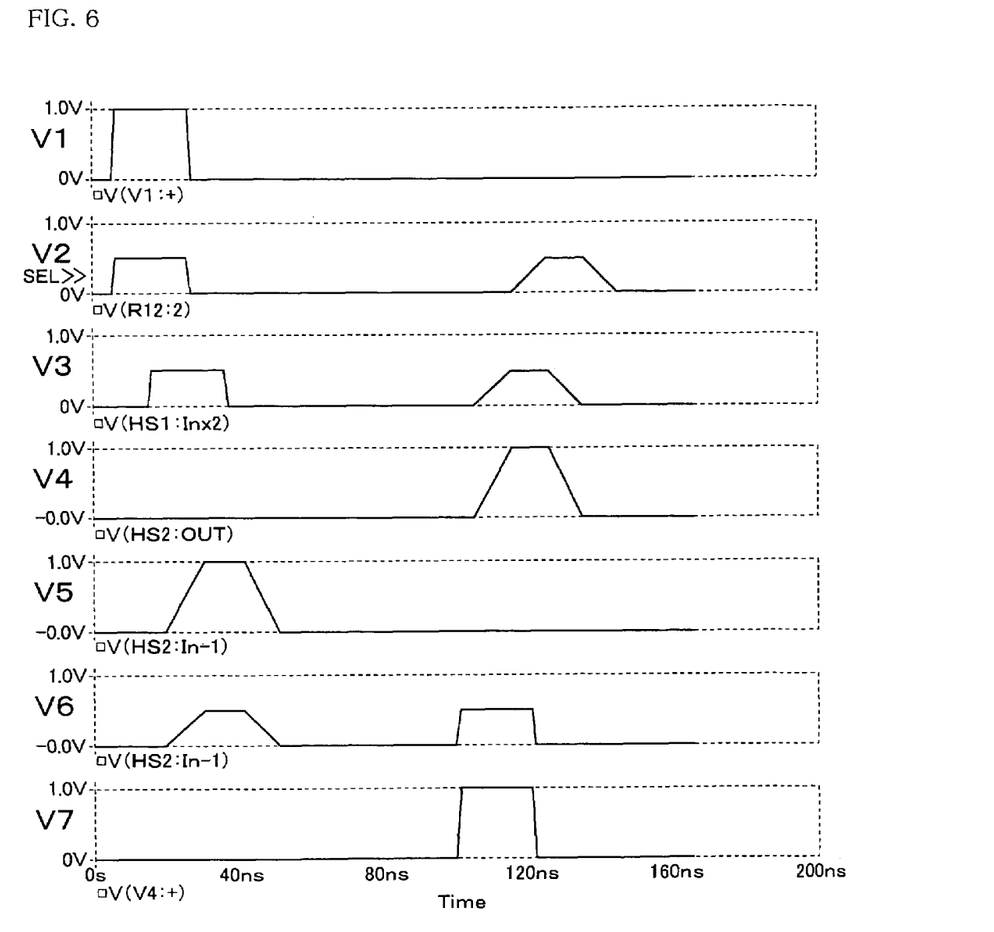
FIG. 6 is a waveform chart showing a voltage waveform at each node depicted in FIG. 5.

FIG. 6 is a waveform chart showing results of measurement of voltage waveforms at respective nodes.

It is to be noted that a delay is 5 ns, a through rate is 100 V/us and a time length of the transmission line 70 is 10 ns. However, the delay of 5 ns is incorporated in a model of the analog computing unit, and a total delay time is 15 ns.

In this case, as shown in FIGS. 5 and 6, when a voltage of 1.0 V is output from the driver Dr of the tester portion (V1), the voltage is lowered at the resistance Rp (V2), the voltage is delayed in the transmission line 70 (V3) and it is input to the first analog computing unit 92-1 from a part before the first resistance Rtp 91-1. Further, a voltage V4 between the first resistance Rtp 91-1 and the second analog computing unit 92-2 is also input to the first analog computing unit 92-1, but this voltage V4 is 0 V. A voltage V3 input to the first analog computing unit 92-1 is multiplied by a predetermined number (two in this example), V4 is subtracted from the voltage multiplied by the predetermined number, and a voltage obtained by this subtraction is output from the first analog computing unit 92-1 (VS). It is to be noted that a leading edge and a trailing edge of the waveform of V5 are smooth due to a through rate of the operational amplifiers constituting the first analog computing unit 92-1.

An output from the first analog computing unit 92-1 is subjected to voltage drop at the second resistance Rts, and an obtained result is transmitted to the DUT 10.

An output (V7) from the ideal driver of the DUT 10 is subjected to voltage drop at the internal resistance Rs of the DUT 10 (V6), and input to the second analog computing unit 92-2 from a part before the second resistance Rts 91-2. Furthermore, a voltage V5 between the second resistance Rtp 91-2 and the first analog computing unit 92-1 is also input to the second analog computing unit 92-2, but this voltage V5 is 0 V. A voltage V6 input to the second analog computing unit 92-2 is multiplied by a predetermined number (two in this example), V5 is subtracted from this voltage multiplied by the predetermined number, and a voltage obtained by this subtraction is output from the second analog computing unit 92-2 (V4).

This output voltage (V4) is transmitted to the tester through the first resistance Rtp 91-1 and the transmission line 70 (V3, V2, V1).

As described above, in the impedance matching circuit 90, when the second resistance Rts 91-2 receives the voltage V6 of 0.5 V from the DUT 10, the voltage V3 which is likewise 0.5 V is output from the first resistance Rtp 91-1. Moreover, since the second resistance Rts 91-2 is 200Ω whereas the first resistance Rtp 91-1 is 50Ω, it can be understood that the impedance is converted to output the voltage to the transmission line 70.

As a result, the output impedance of V3 is as small as 50Ω, and hence the transmission line 70 can be driven.

(Measurement 2)

A description will now be given as to voltage waveforms at respective nodes of the input-output circuit 40 when the terminating resistance Rp of the tester, the impedance Zo of the transmission line and the first resistance Rtp are respectively 50Ω (Rp=Zo=Rtp=50Ω) and the DUT side is short-circuited to GND with reference to FIGS. 7 and 8.

Figure 7:
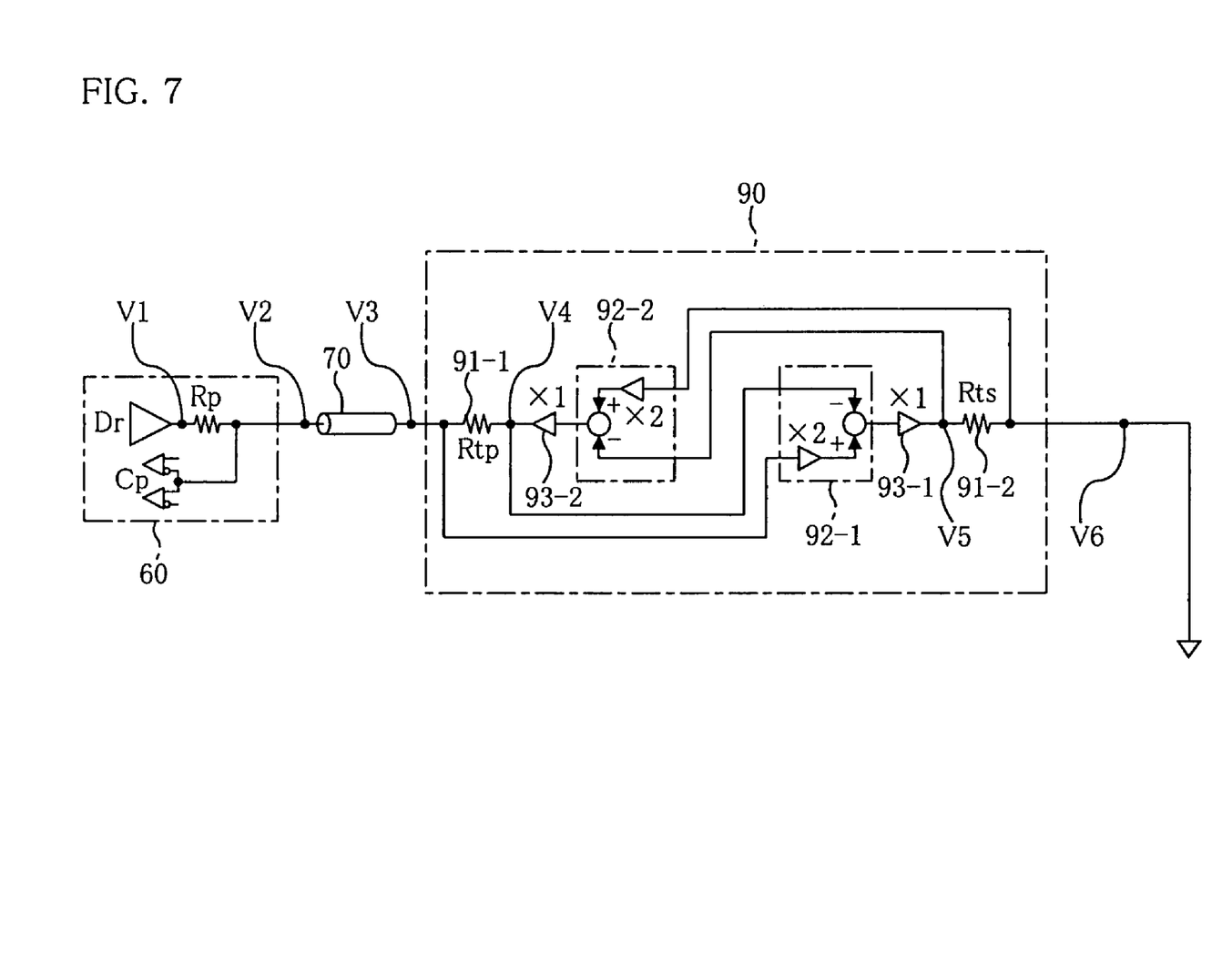
FIG. 7 is an electronic circuit diagram showing a position of each node of the input-output circuit in which a DUT side is short-circuited.
Figure 8:
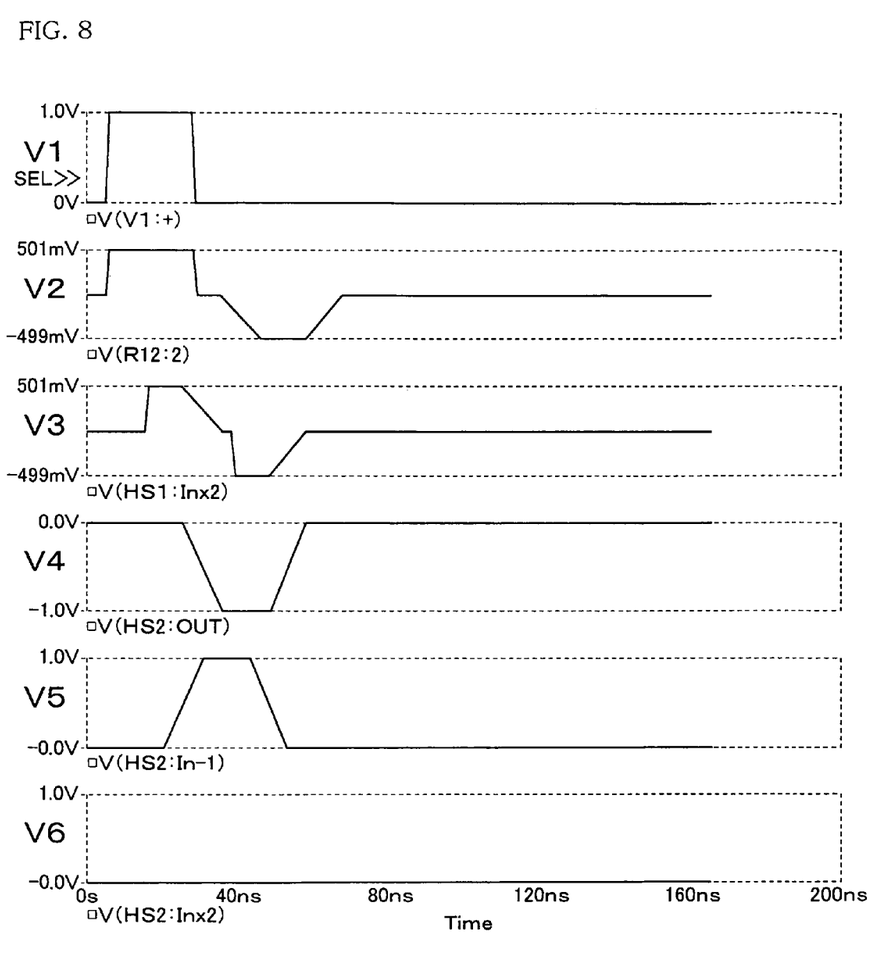
FIG. 8 is a waveform chart showing a voltage waveform at each node depicted in FIG. 7.

In this case, functions of the respective elements in the impedance matching circuit 90 shown in FIG. 7 are the same as functions of the respective elements of the impedance matching circuit depicted in FIG. 5. However, since the DUT side is short-circuited to GND, an output signal of the tester driver Dr is returned with a reflection coefficient −1. This state is represented by V5→V4 in FIG. 8.

(Measurement 3)

A description will now be given as to voltage waveforms at respective nodes in the input-output circuit 40 when the terminating resistance Rp of the tester, the impedance Zo of the transmission line and the first resistance Rtp are respectively 50Ω (Rp=Zo=Rtp=50Ω) and the DUT side is open with reference to FIGS. 9 and 10.

Figure 9:
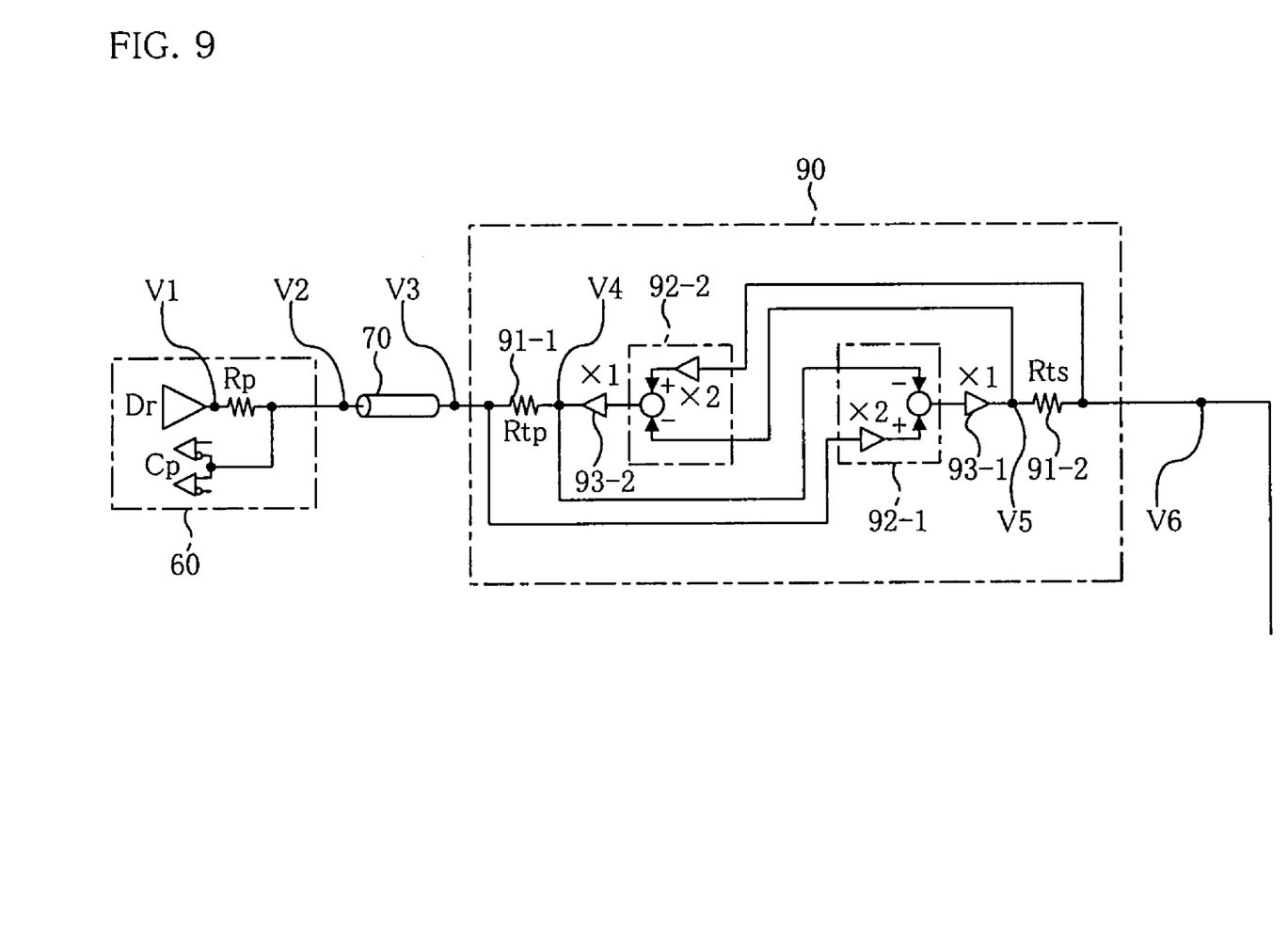
FIG. 9 is an electronic circuit diagram showing a position of each node of the input-output circuit in which the DUT side is opened.
Figure 10:
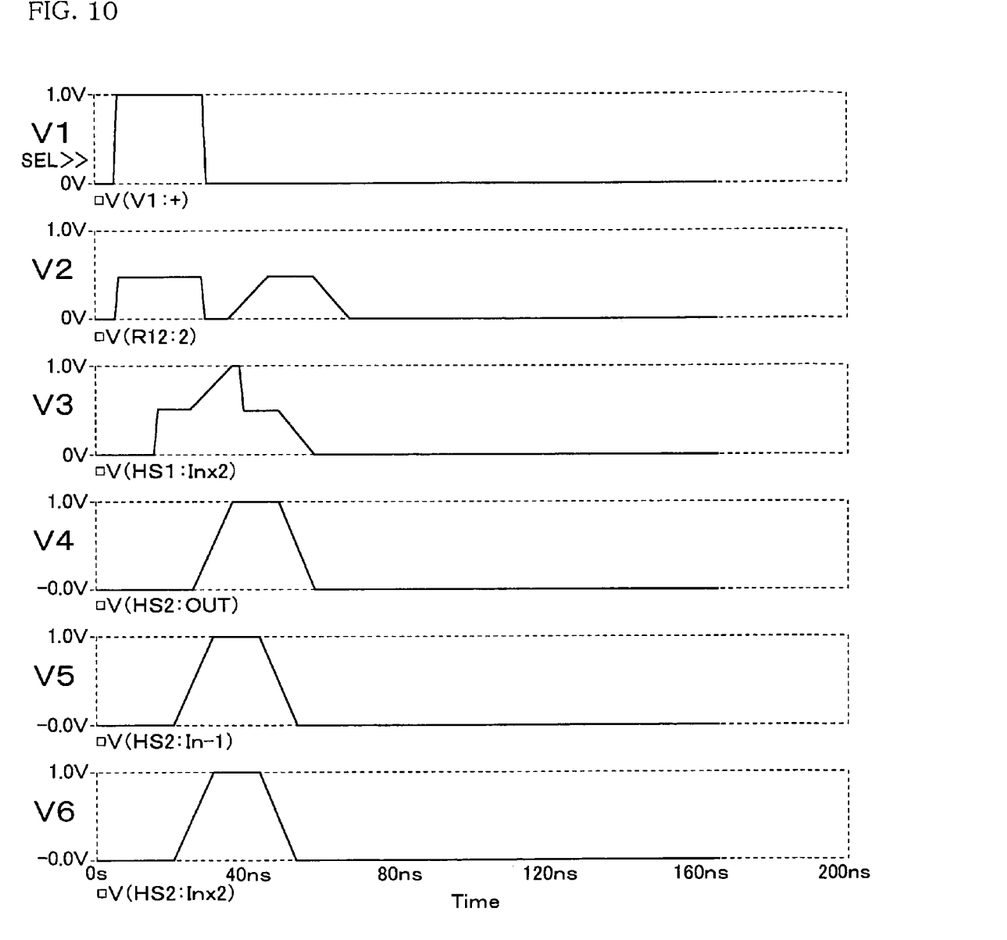
FIG. 10 is a waveform chart showing a voltage waveform at each node depicted in FIG. 9.

In this case, functions of the respective elements in the impedance matching circuit 90 shown in FIG. 9 are the same as functions of the respective elements in the impedance matching circuit 90 depicted in FIG. 5. However, since the DUT side is open, an output signal of the tester driver Dr is totally reflected to be returned. FIG. 10 shows this state.

[Another Structural Example of Input-output Circuit]

Figure 11:
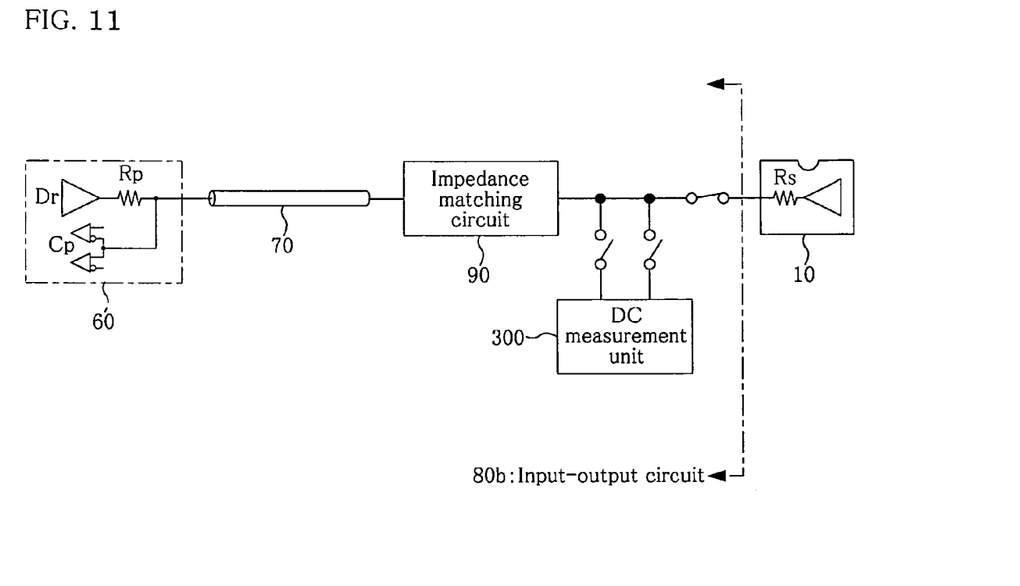
FIG. 11 is an electronic circuit diagram showing another configuration of the input-output circuit.

Another structural example of the input-output circuit according to this embodiment will now be described with reference to FIG. 11.

As shown in the drawing, as another structural example of the input-output circuit 40, it is possible to adopt a structure in which a DC measurement unit 300 is connected in parallel between an impedance matching circuit 90 and a DUT 10.

The DC measurement unit 300 is a measurement unit used for a DC test or the like, and usually connected in parallel between a tester portion and a transmission line 70 through a switch.

In this embodiment, since the impedance matching circuit 90 is connected between the transmission line 70 and the DUT 10, the DC measurement unit 300 is connected in parallel between the impedance matching circuit 90 and the DUT 10 in order to conduct a DC test of the DUT 10.

It is to be noted that an internal configuration, a function and others of the DC measurement unit 300 are disclosed in Japanese Patent Application Laid-open No. 2002-107405.

Although the above has described the preferred embodiments of the impedance matching circuit, the input-output circuit and the semiconductor test apparatus according to the present invention, the impedance matching circuit, the input-output circuit and the semiconductor test apparatus according to the present invention are not restricted to the foregoing embodiments only, and it is needless to say that the various modifications can be carried out within a scope of the present invention.

For example, although the above has described the embodiment in which the impedance matching circuit is connected in the vicinity of the DUT in the semiconductor test apparatus including one transmission line alone, the semiconductor test apparatus is not restricted to one including one transmission line only, and the impedance matching circuit can be connected in the vicinity of the DUT in a semiconductor test apparatus including a plurality of transmission lines.

Since the present invention is an invention which enables an output signal from the DUT to be output with low impedance, the present invention can be utilized for an apparatus or a device which receives an output signal from the DUT.

What is claimed is:

1. An impedance matching circuit having:
   a first resistance;
   a first analog computing unit which multiplies a voltage at one end of the first resistance by a predetermined number, subtracts a voltage at the other end of the first resistance from the voltage multiplied by the predetermined number, and outputs a voltage obtained by the subtraction;
   a second resistance connected to an output side of the first analog computing unit; and
   a second analog computing unit which multiplies a voltage at one end of the second resistance by a predetermined number, subtracts a voltage at the other end of the second resistance from the voltage multiplied by the predetermined number, and outputs a voltage obtained by the subtraction,
   wherein the first resistance is connected to an output side of the second analog computing unit.

2. The impedance matching circuit according to claim 1, wherein a first buffer is connected between the output side of the first analog computing unit and the second resistance.

3. The impedance matching circuit according to claim 2, wherein the first buffer has a voltage gain 1 or an amplification factor of a predetermined multiple.

4. The impedance matching circuit according to claim 1, wherein a second buffer is connected between the output side of the second analog computing unit and the first resistance.

5. The impedance matching circuit according to claim 4, wherein the second buffer has a voltage gain 1 or an amplification factor of a predetermined multiple.

6. The impedance matching circuit according to claim 1, wherein the first analog computing unit has:
   a first operational amplifier which non-inverting-inputs the voltage at one end of the first resistance;
   a second operational amplifier which non-inverting-inputs the voltage at the other end of the first resistance;
   a third operational amplifier which non-inverting-inputs an output from the first operational amplifier and inverting-inputs an output from the second operational amplifier;
   an inverting input side resistance which is connected between an output side of the second operational amplifier and an inverting input terminal of the third operational amplifier; and
   a feedback resistance having one end connected with an output side of the third operational amplifier and the other side connected with the inverting input terminal of the third operational amplifier.

7. The impedance matching circuit according to claim 1, wherein the second analog computing unit has:
   a first operational amplifier which non-inverting-inputs the voltage at one end of the second resistance;
   a second operational amplifier which non-inverting-inputs the voltage at the other end of the second resistance;
   a third operational amplifier which non-inverting-inputs an output from the first operational amplifier and inverting-inputs an output from the second operational amplifier;
   an inverting input side resistance which is connected between an output side of the second operational amplifier and an inverting input terminal of the third operational amplifier; and
   a feedback resistance having one end connected with the output side of the third operational amplifier and the other end connected with the inverting input terminal of the third operational amplifier.

* * * * *